(12) United States Patent
Latham, II et al.

(10) Patent No.: US 8,698,469 B1
(45) Date of Patent: Apr. 15, 2014

(54) SYSTEM AND METHOD FOR PREDICTING OUTPUT VOLTAGE RIPPLE AND CONTROLLING A SWITCHED-MODE POWER SUPPLY

(75) Inventors: Paul Walker Latham, II, Lee, NH (US); Mansur Kiadeh, Cupertino, CA (US)

(73) Assignee: Maxim Integreated Products, Inc., San Jose, CA (US)

( * ) Notice: Subject to any disclaimer, the term of this patent is extended or adjusted under 35 U.S.C. 154(b) by 192 days.

(21) Appl. No.: 13/230,263

(22) Filed: Sep. 12, 2011

(51) Int. Cl.
*G05F 1/565* (2006.01)
*G05F 5/00* (2006.01)
*H02M 1/14* (2006.01)

(52) U.S. Cl.
USPC .......................................... 323/283; 327/339

(58) Field of Classification Search
USPC ........... 323/283; 381/71.6; 375/148; 327/339
See application file for complete search history.

(56) References Cited

U.S. PATENT DOCUMENTS

| | | | | |
|---|---|---|---|---|
| 4,326,169 | A * | 4/1982 | Fenderson et al. | 327/309 |
| 7,113,557 | B2 * | 9/2006 | Kaku et al. | 375/148 |
| 7,498,781 | B2 * | 3/2009 | Canfield et al. | 323/280 |
| 7,969,756 | B1 * | 6/2011 | Wu | 323/283 |
| 2010/0117615 | A1 * | 5/2010 | Prodic et al. | 323/283 |
| 2010/0127682 | A1 * | 5/2010 | Kenly et al. | 323/282 |
| 2013/0049723 | A1 * | 2/2013 | Latham, II et al. | 323/282 |

OTHER PUBLICATIONS

E. Tedeschi, P. Mattavelli, D. Trevisan, and L. Corradini, "Repetitive ripple estimation in multi-sampling digitally controlled dc-dc converters," in Proc. IEEE IECON, Paris, France, Nov. 6-10, 2006, pp. 1685-1690.*
U.S. Appl. No. 13/034,005, filed Feb. 24, 2011, Kiadeh, et al.
U.S. Appl. No. 13/230,311, filed Sep. 12, 2011, Kiadeh, et al.
Abe, N., et al., "Smith Predictor Control and Internal Model Control—A Tutorial—", SICE Annual Conference in Fukui, (Aug. 4-6, 2003), Fukui University, Japan, PR0001/03/0000-1257, pp. 1383-1387.

* cited by examiner

*Primary Examiner* — Jue Zhang
*Assistant Examiner* — Jye-June Lee

(57) ABSTRACT

A system includes a sinc filter module and a cyclic integrator module. The sinc filter module (i) determines a direct current (DC) voltage component of an error between a measured output voltage of a switched-mode power supply and a reference voltage and (ii) determines a signal with ripple by subtracting the determined DC voltage component from the error. The cyclic integrator module (i) applies a learning gain to a difference between the determined signal with ripple and a predicted ripple, (ii) performs integration of each of N segments of the gain-applied difference, and (iii) generates the predicted ripple by reconstructing the N integrated segments, wherein N is an integer greater than one.

18 Claims, 12 Drawing Sheets

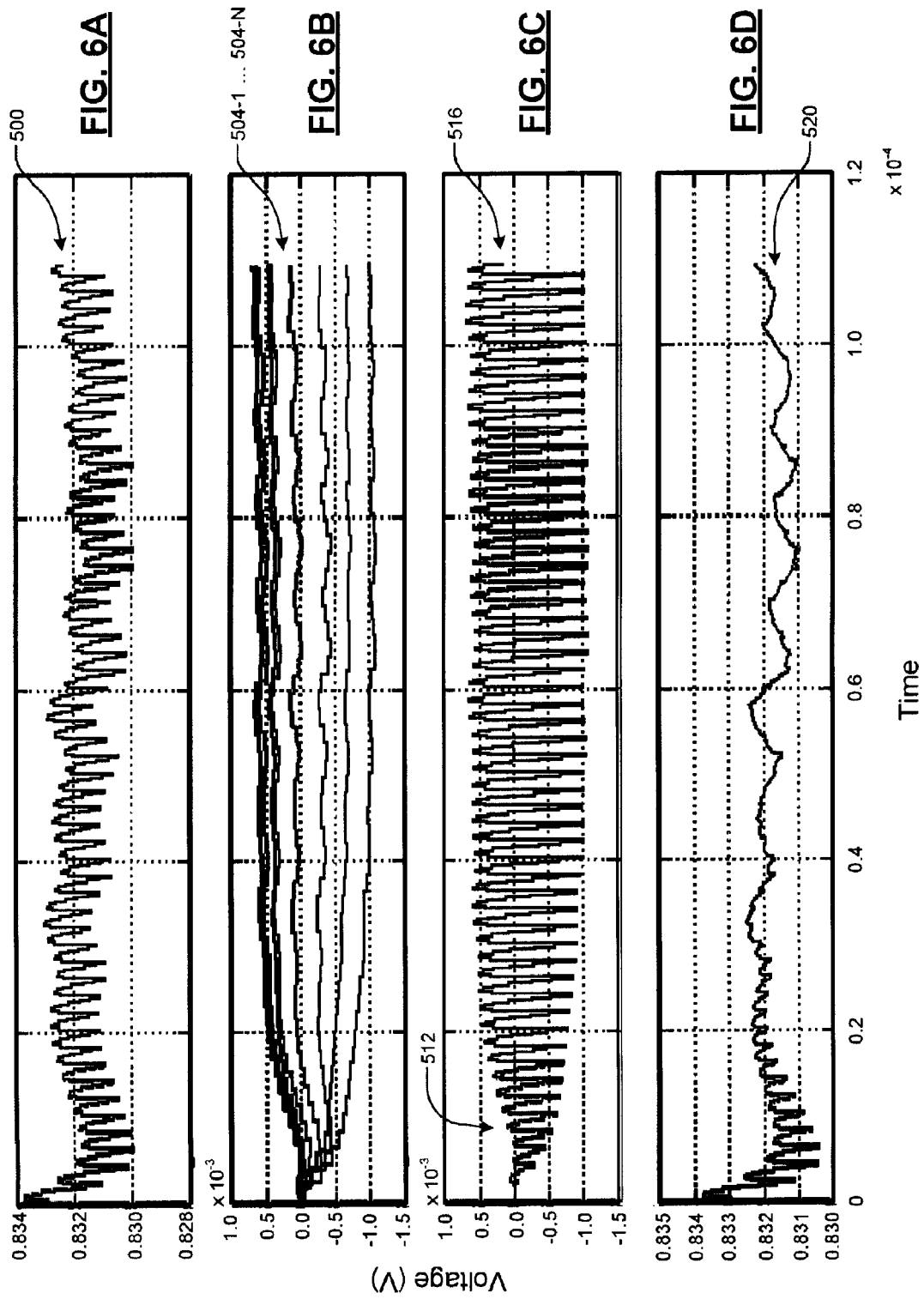

SYSTEM AND METHOD FOR PREDICTING OUTPUT VOLTAGE RIPPLE AND CONTROLLING A SWITCHED-MODE POWER SUPPLY

FIELD

The present disclosure relates to power supplies and more particularly to a system and method for predicting output voltage ripple and controlling a switched-mode power supply.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A power supply receives input power and generates output power that may be used to power one or more components. For example, the output power may be used to power one or more components of an integrated circuit (IC). The output power may be generated by manipulating the input power. Linear power supplies (or linear regulators) may generate the output power by dissipating a portion of the input power. Switched-mode power supplies, on the other hand, may control switching of transistors to charge/discharge an inductor which provides the output power. Switched-mode power supplies, therefore, may be more efficient than linear power supplies. The switching of switched-mode power supplies, however, may cause output voltage ripple.

Notch filters (also known as band-reject filters) may be used in pulse-width modulated (PWM) controlled systems to attenuate unwanted frequency components from a control signal in a given frequency range. For example, notch filters may be used in switched-mode power supplies to remove output voltage ripple. Referring now to FIG. 1, a notch filter 10 is shown that receives an input signal x(n) and generates an output signal y(n) having attenuated frequency components in a given frequency range. A first adder 12 generates a sum of the input signal x(n) and outputs of first and second amplifiers 14 and 16 having gains $-a_1$ and $-a_2$, respectively. A third amplifier 18 applies a gain $b_0$ to the output of the first adder 12.

A first delay 20 applies a one unit delay (z') to the output of the first adder 12. The first amplifier 14, a fourth amplifier 22, and a second delay 24 each receive the output of the first delay 20. The first amplifier 14 applies the gain $-a_1$ to the output of the first delay 20. The fourth amplifier 22 applies a gain $b_1$ to the output of the first delay 20. The second delay 24 applies a one unit delay ($z^{-1}$) to the output of the first delay 20. The second amplifier 16 and a fifth amplifier 26 each receive the output of the second delay 24. The second amplifier 16 applies the gain $-a_2$ to the output of the second delay 24. The fifth amplifier 26 applies a gain $b_2$ to the output of the second delay 24. A second adder 28 generates the output signal y(n) by summing the outputs of the third, fourth, and fifth amplifiers 18, 22, and 26, respectively.

The transfer function H(z) performed by the notch filter 10 may be expressed as follows:

$$H(z) = \frac{b_0 + b_1 z^{-1} + b_2 z^{-2}}{1 + a_1 z^{-1} + a_2 z^{-2}}.$$

SUMMARY

A system includes a sinc filter module and a cyclic integrator module. The sinc filter module (i) determines a direct current (DC) voltage component of an error between a measured output voltage of a switched-mode power supply and a reference voltage and (ii) determines a signal with ripple by subtracting the determined DC voltage component from the error. The cyclic integrator module (i) applies a learning gain to a difference between the determined signal with ripple and a predicted ripple, (ii) performs integration of each of N segments of the gain-applied difference, and (iii) generates the predicted ripple by reconstructing the N integrated segments, wherein N is an integer greater than one.

A method includes determining a direct current (DC) voltage component of an error between a measured output voltage of a switched-mode power supply and a reference voltage, determining a signal with ripple by subtracting the determined DC voltage component from the error, applying a learning gain to a difference between the determined signal with ripple and a predicted ripple, performing integration of each of N segments of the gain-applied difference, wherein N is an integer greater than one, and generating the predicted ripple by reconstructing the N integrated segments.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6A is a graph illustrating simulated transient response of the ripple canceller module of FIG. 4;

FIG. 6B is a graph illustrating simulated steady-state response of the ripple canceller module of FIG. 4;

FIG. 6C is an example graph illustrating acquisition of a ripple value followed by an estimated ripple.

FIG. 6D is an example graph illustrating an output signal that is provided to a compensator module.

DETAILED DESCRIPTION

Figure 1:
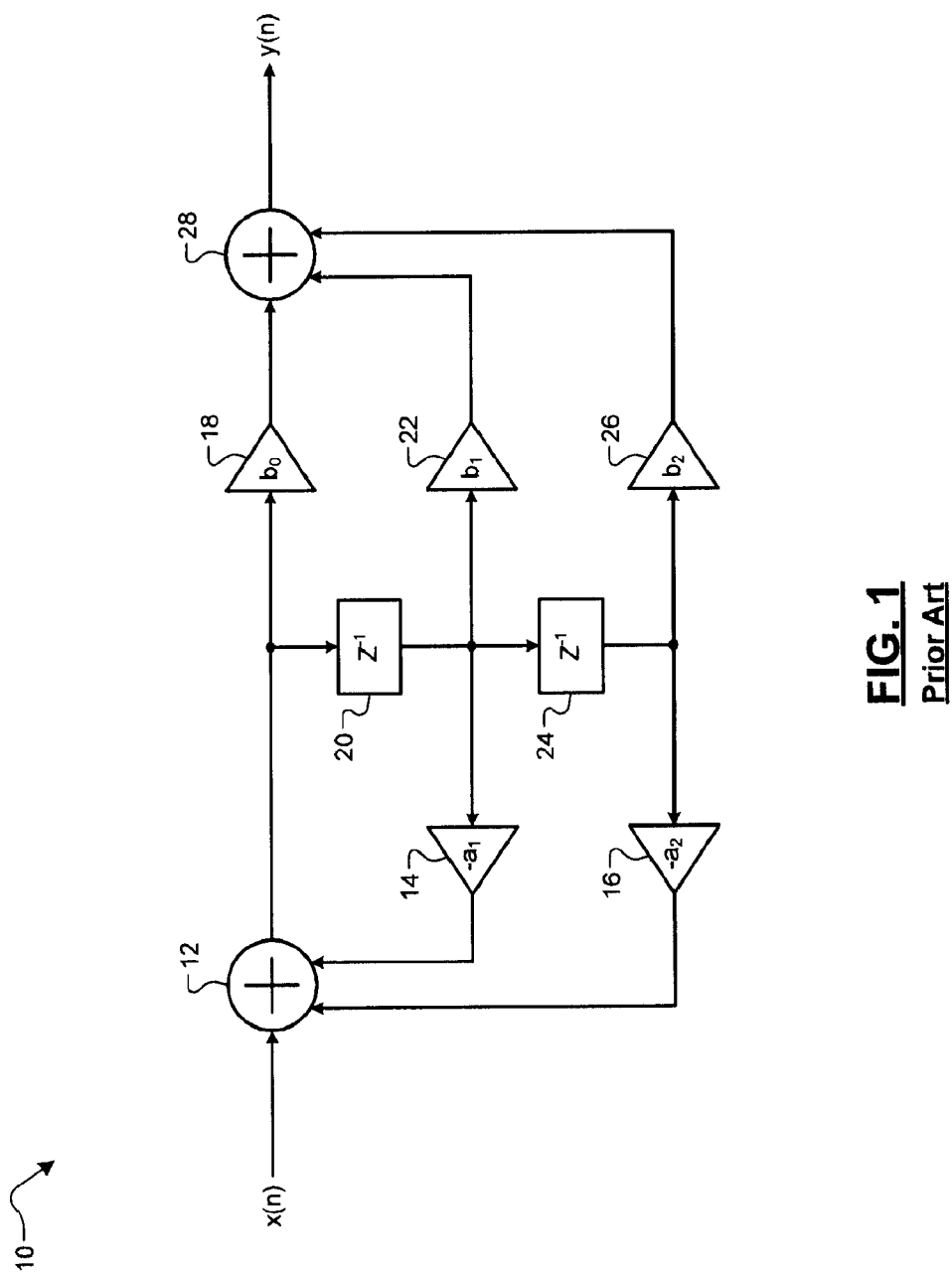
FIG. 1 is a functional block diagram of an example notch filter according to the prior art.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As previously described, the switching of a switched-mode power supply may cause output voltage ripple. The output voltage ripple may cause problems, particularly during high bandwidth operation. Specifically, average current mode control and state space control in a switched-mode power supply each have bandwidth limitations for maintaining a desired efficiency. Notch filters, low-pass filters, and/or finite impulse response (FIR) filters may be implemented to remove the output voltage ripple. These filters typically operate at high frequencies and suffer from phase loss thereby resulting in control loops having low signal quality. In addition, these filters are typically complex and have orders of two or higher (e.g., the notch filter 10 of FIG. 1 is a second order filter). Complex, high-order filters may increase surface area and/or cost of an integrated circuit (IC).

Accordingly, systems and methods are presented for predicting output voltage ripple and controlling a switched-mode power supply. The systems and methods may first use a sinc filter module to determine a direct current (DC) voltage component of an error between a measured output voltage of the switched-mode power supply and a desired (reference) voltage. The sinc filter module may then determine a signal with ripple by subtracting the determined DC voltage component from the error. The systems and methods may then use a cyclic integrator module to generate a predicted ripple by applying a learning gain to a difference between the determined signal with ripple and the predicted ripple. The sinc filter module may then integrate segments of the gain-applied difference. This active integration may include dividing a gain-applied difference into N segments (N>1) and then integrating the N segments using N integrators, respectively. The N integrated segments may then be reconstructed to generate the predicted ripple. The predicted ripple may be used to perform either ripple cancelling or parameter estimation.

More specifically, either (i) a ripple removal module may generate a filtered error by subtracting the predicted ripple from the error or (ii) a ripple analyzer module may determines one or more operating parameters of the switched-mode power supply based on the predicted ripple. A control module may then use either the filtered error or the determined operating parameter(s) for improved feedback control of the switched-mode power supply. For example, a compensator of the control module may perform adaptive gain control (AGC) of a duty cycle of the switched-mode power supply based on the filtered error or the determined operating parameter(s). Additionally, in some implementations the system and method of the present disclosure may be generally directed to implementing an exact, synchronous, high quality factor (Q) notch filter for PWM controlled systems.

Figure 2:
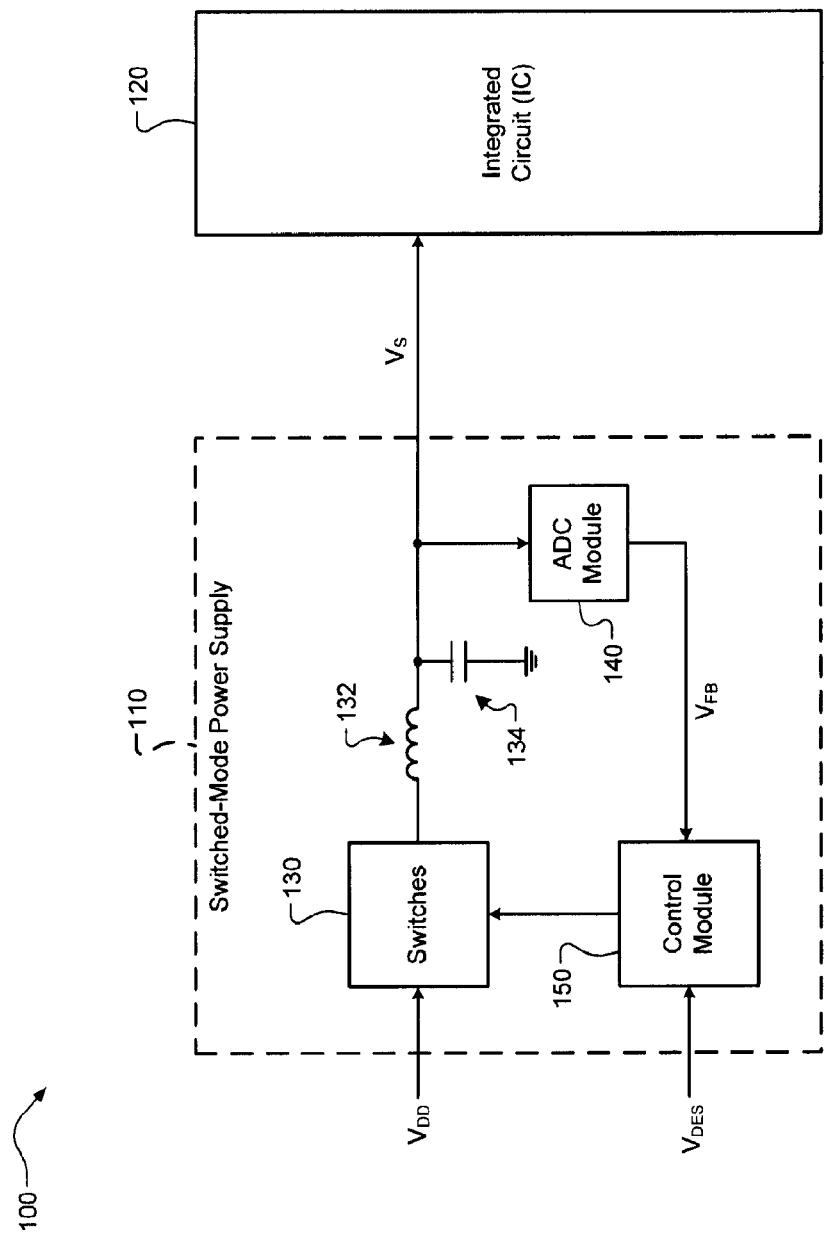
FIG. 2 is a functional block diagram of an example system that includes a switched-mode power supply.

Referring now to FIG. 2, a system 100 includes a switched-mode power supply 110 that powers an IC 120. For example, the switched-mode power supply 110 may be a direct current (DC) to DC power supply. The switched-mode power supply 110 receives a supply voltage ($V_{DD}$) and a user input indicating a desired output voltage ($V_{DES}$). The switched-mode power supply 110 uses the supply voltage $V_{DD}$ to generate an output voltage ($V_S$) having a magnitude approximately equal to the desired (reference) output voltage $V_{DES}$. The output voltage $V_S$ is used to power the IC 120 or another suitable device.

The switched-mode power supply 110 may further include one or more switches 130, an inductor 132, and a capacitor 134 connected in parallel to the inductor 132. For example, the switches 130 may be transistors such as field effect transistors (FETs). The output voltage $V_S$ may also be used as feedback (represented by $V_{FB}$). The measured output voltage $V_{FB}$ may be sampled from the output voltage $V_S$ using an analog-to-digital converter (ADC) 140 or another suitable voltage measurement device and therefore may also be referred to as measured output voltage $V_{FB}$.

A control module 150 controls switching of the switches 130 based on an error between the measured output voltage $V_{FB}$ and the desired (reference) output voltage $V_{DES}$. More specifically, controlling the switches 130 selectively connect/disconnect the inductor 132 to the supply voltage $V_{DD}$ thereby charging/discharging the inductor 132, respectively.

The capacitor 134 acts as a filter to fluctuations in the output voltage $V_S$. Output voltage ripple, however, may still occur.

Figure 3A:
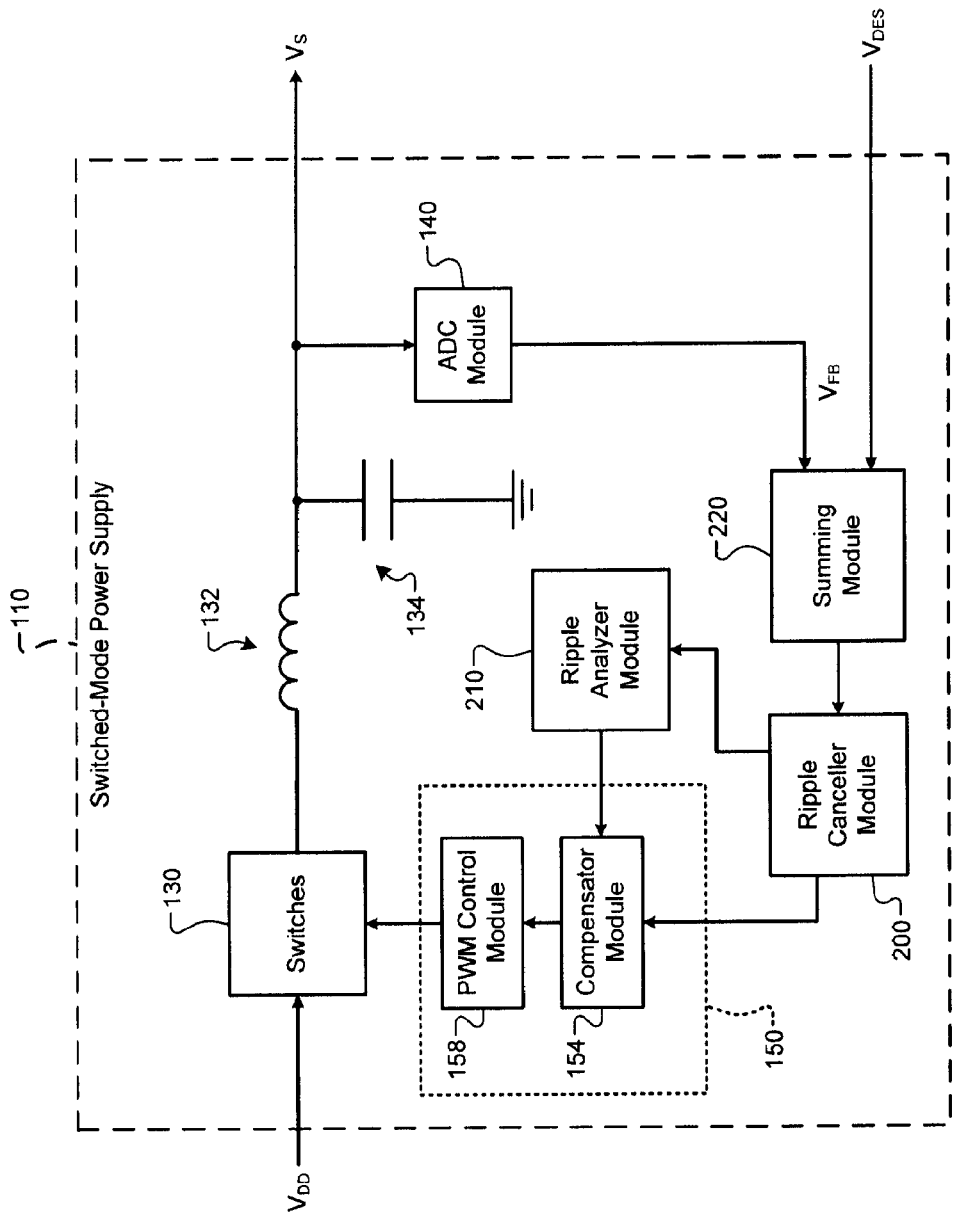
FIG. 3A is a functional block diagram of an example switched-mode power supply.

Referring now to FIG. 3A, an example of the switched-mode power supply 110 having a ripple canceller module 200 and a ripple analyzer module 210 is shown. The switched-mode power supply 110 may further include a summing module 220 that calculates a sum of the measured output voltage $V_{FB}$ and the desired (reference) voltage $V_{DES}$. The output of the summing module 220 may represent an error, which is used as feedback in controlling the switched-mode power supply 110. While a summing module 220 is shown and described, depending on the implementation an error or difference module (not shown) may determine the error between the measured output voltage $V_{FB}$ and the desired (reference) voltage $V_{DES}$.

The ripple canceller module 200 receives the error. The error, however, may include ripple. As shown, the ripple canceller module 200 is located in-line with the error (between the summing module 220 and the control module 150). The ripple canceller module 200, however, may also be located at other suitable locations such as in the ADC 140 or in the control module 150. The ripple canceller module 200 may remove ripple from the calculated error. More specifically, the ripple canceller module 200 may predict a magnitude of the ripple. The ripple canceller module 200 may then generate a filtered error by subtracting the predicted ripple from the error.

The control module 150 may further include a compensator module 154, and a PWM control module 158. The compensator module 154 may generate a duty cycle for the switched-mode power supply 110 based on the filtered error from the ripple canceller module 200. The PWM control module 158 may then generate PWM control signals for the switches 130 based on the duty cycle generated by the compensator module 154. For example, the compensator module 154 may perform AGC of the duty cycle of the switched-mode power supply 110 based on the filtered error.

Additionally or alternatively, the ripple canceller module 200 may bypass generating the filtered error and may output the predicted ripple. The ripple analyzer module 210 receives the predicted ripple (via the feature described above). The ripple analyzer module 210 determines an operating parameter of the switched-mode power supply 110 based on the predicted ripple. The operating parameter may include at least one of equivalent series resistance (ESR), equivalent series inductance (ESL), capacitance (C), resistances of the switches 130 when in an on state, or another suitable operating parameter. The ripple analyzer module 210 may then output the determined operating parameter(s) to the control module 150. For example, the compensator module 154 may perform AGC of the duty cycle of the switched-mode power supply 110 based on the determined operating parameter(s).

Figure 3B:
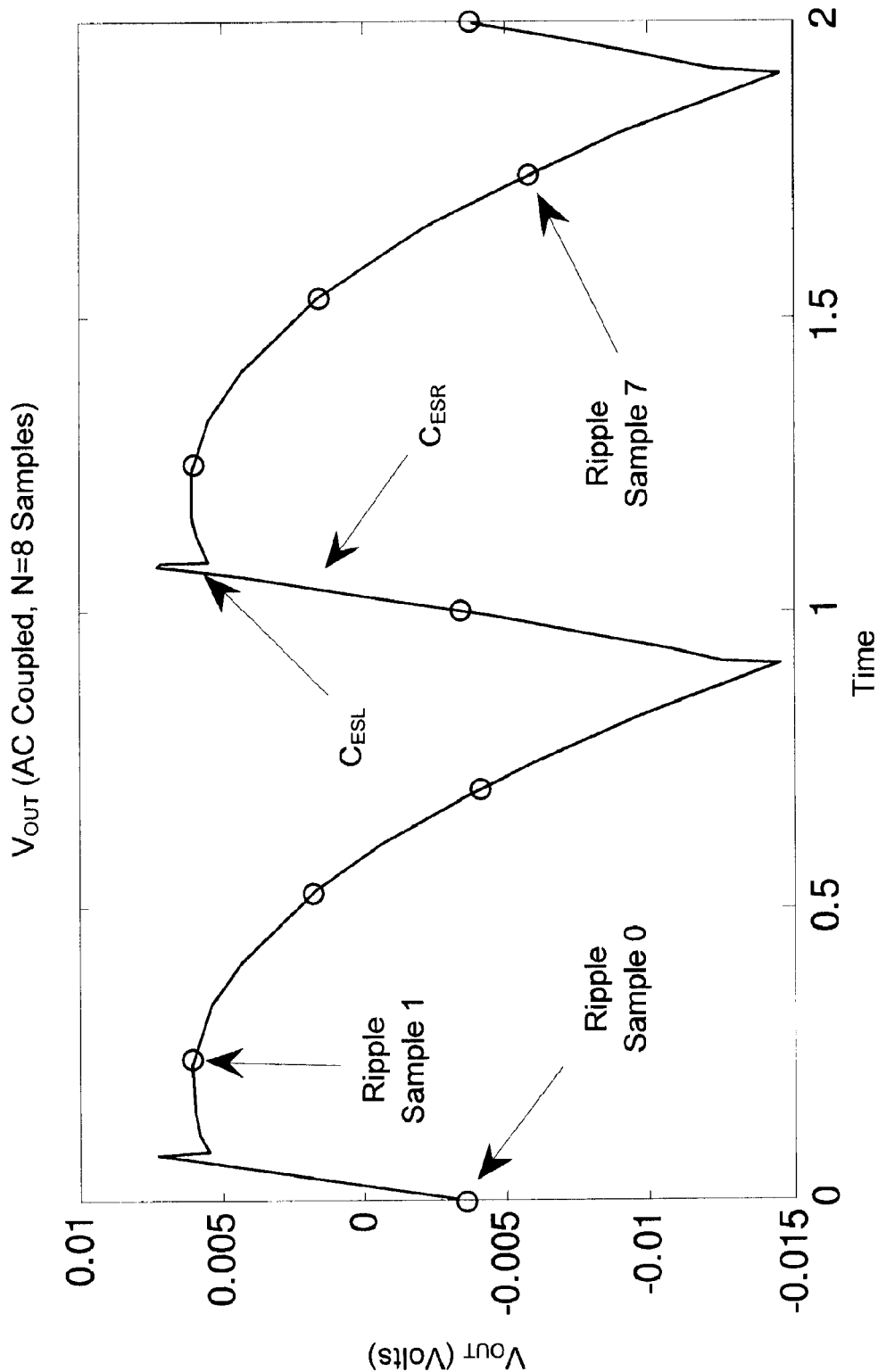
FIG. 3B is a graph illustrating a simulated sampling of output voltage ripple.

Referring now to FIG. 3B, a simulation of ripple that may be found in the calculated error is shown. As can be seen, the magnitude of the ripple may reach a maximum of approximately −0.015 V. Particularly during high loop bandwidth, this ripple can cause instability in both analog and digital switched-mode power supplies. The example also illustrates that the ripple can be effectively sampled in eight samples (N=8) and that operating parameters such as equivalent series resistance (ESR) and equivalent series inductance (ESL) can be determined (or estimated) based on the ripple waveform.

Figure 4:
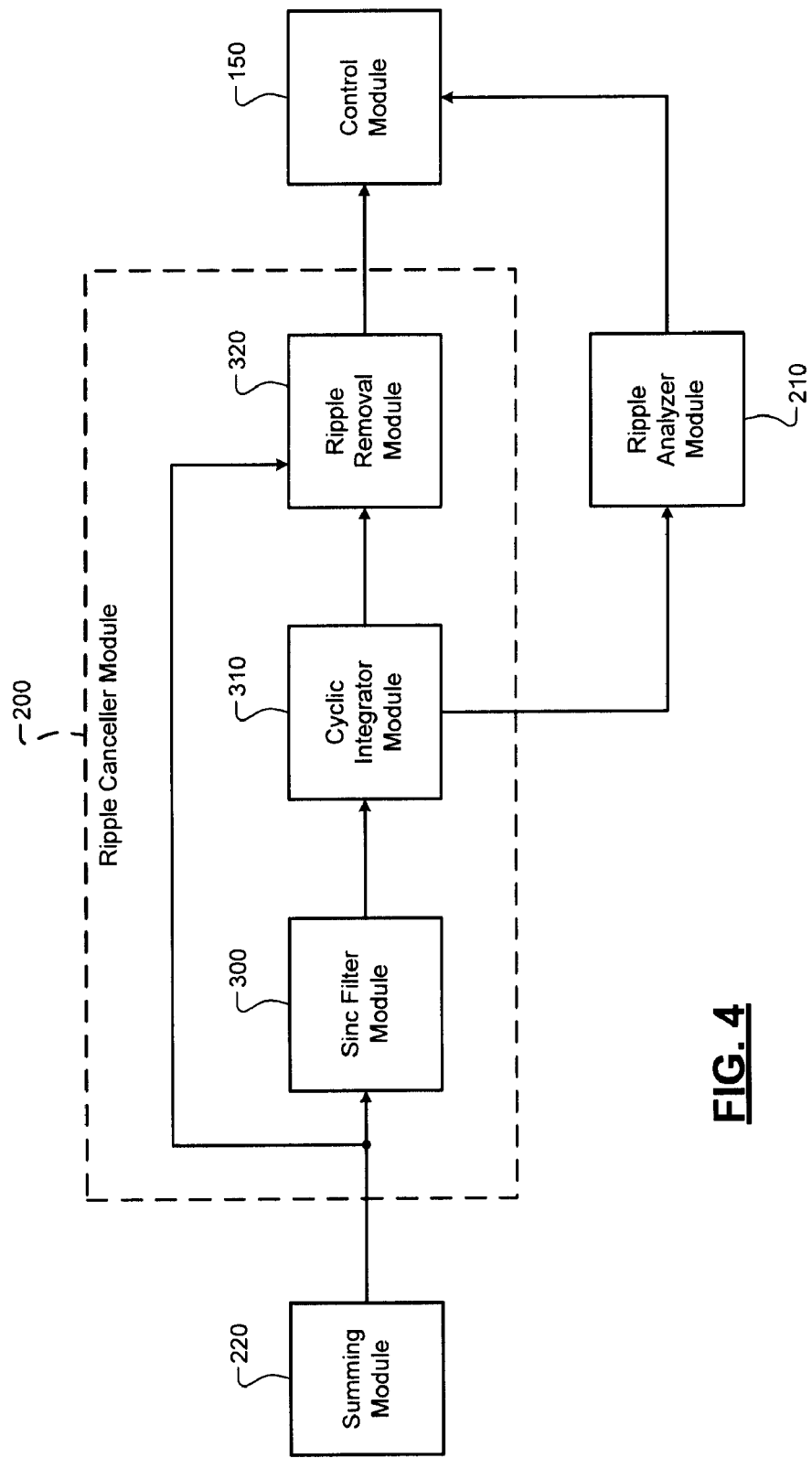
FIG. 4 is a functional block diagram of an example ripple canceller module.

Referring now to FIG. 4, an example of the ripple canceller module 200 is shown. The ripple canceller module 200 includes a sinc filter module 300, a cyclic integrator module 310, and a ripple removal module 320. The sinc filter module 300 receives the error from the summing module 220. The sinc filter module 300 removes frequency components above a given bandwidth, and therefore may also be referred to as an ideal low-pass filter. More specifically, the sinc filter module 300 extracts and removes a DC component from the error to determine the signal with ripple.

The cyclic integrator module 310 receives the signal with ripple from the sinc filter module 300. The cyclic integrator module 310 applies a learning gain to a difference between the signal with ripple and a predicted ripple, performs integration on each of a plurality of segments of the gain-applied difference, and then reconstructs the N integrated segments. For example, the cyclic integrator module 310 may include one integrator for each sample period/interval per PWM cycle of the switched-mode power supply 110. In other words, the cyclic integrator module 310 may divide the gain-applied difference into N segments (N>1), integrate each of the N segments individually, and then reconstruct the N integrated segments to generate the predicted ripple. For example only, and as previously described, N may equal eight.

The cyclic integrator module 310 may output the predicted ripple to the ripple removal module 320. The ripple removal module 320 may calculate a difference between the error and the predicted ripple to generate the filtered error. The filtered error is provided to the control module 150 (i.e., the compensator module 154) for controlling a PWM switching frequency of the switches 130. Additionally or alternatively, the cyclic integrator module 310 may output the predicted ripple to the ripple analyzer module 210 for determination of operating parameter(s).

Figure 5A:
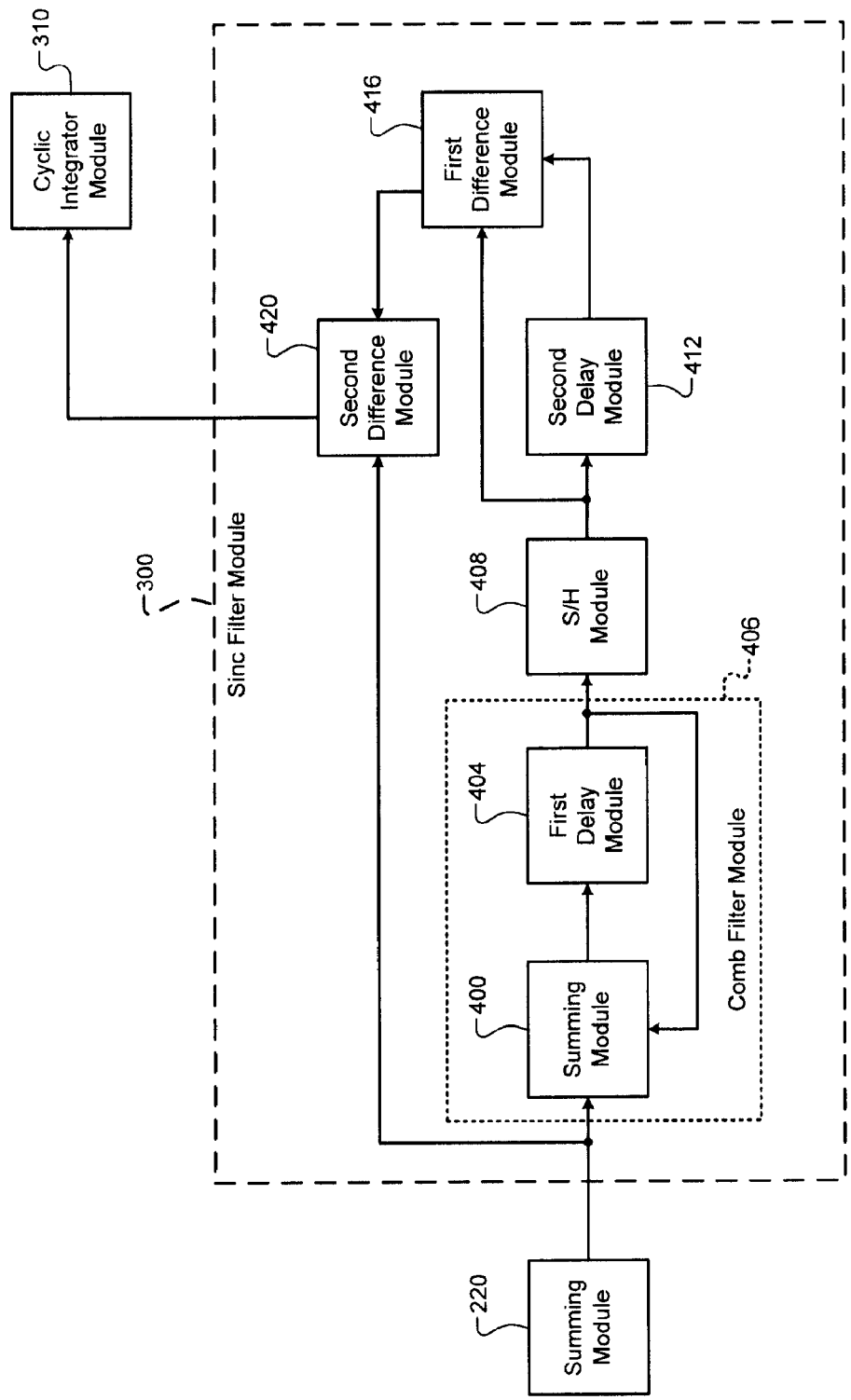
FIG. 5A is a functional block diagram of an example sinc filter module.

Referring now to FIG. 5A, an example of the sinc filter module 300 is shown. The sinc filter module 300 may include a summing module 400, a first delay module 404, a sample-and-hold (S/H) module 408, a second delay module 412, a first difference module 416, and a second difference module 420.

The summing module 400 calculates sum of (i) the error from summing module 220 and (ii) a delayed sum. The delayed sum is based on the first difference after a first predetermined period. For example, the first predetermined period may be based on a Nyquist frequency of the switched-mode power supply 110. The first delay module 404 generates the delayed sum by introducing a delay of the first predetermined period to the sum. For example only, the first delay module 404 may introduce a one unit/sample delay. The summing module 400 and the first delay module 404 may collectively be referred to as a comb filter module 406. For example, the comb filter module 406 may generate a comb-shaped frequency response at the PWM frequency of the switched-mode power supply 110.

The S/H module 408 samples the delayed sum and holds the delayed sum for a second predetermined period. In other words, the S/H module 408 captures the delayed sum and outputs the captured delayed sum for the second predetermined period. For example, the second predetermined period may also be based on the Nyquist frequency of the switched-mode power supply 110. For example only, the second predetermined period may be eight units/samples. The second delay module 412 introduces a delay of a third predetermined period to the output of the S/H module 408. For example only, the second delay module 412 may introduce an eight unit/sample delay.

The first difference module 416 determines a DC component of the error by calculating a first difference between (i) the output of the S/H module 408 and (ii) the output of the second delay module 412. The second difference module 420 determines the signal with ripple by calculating a second difference between (i) the error and (ii) the determined DC component. The determined signal with ripple may then be output to the cyclic integrator module 310.

Figure 5B:
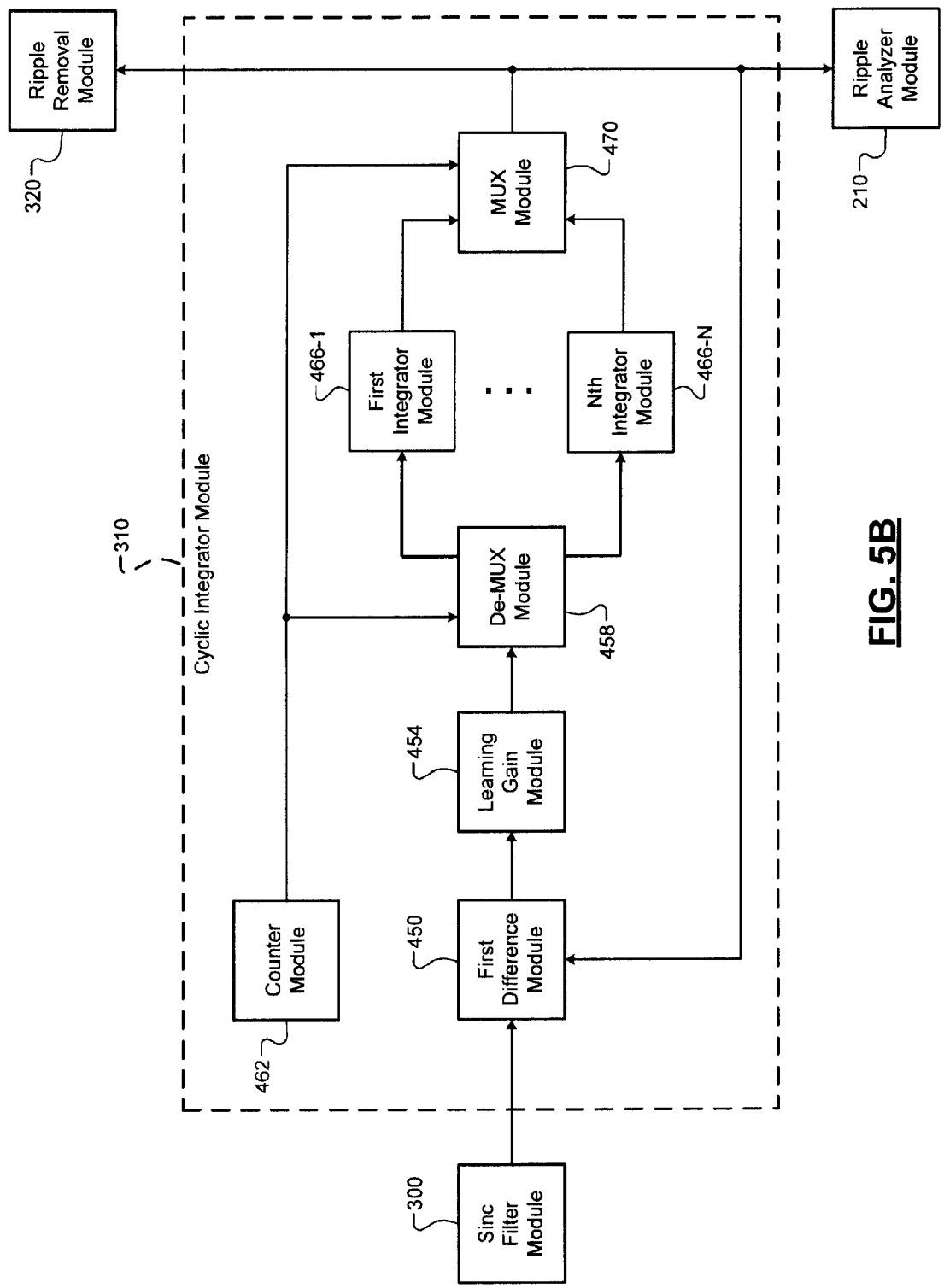
FIG. 5B is a functional block diagram of an example cyclic integrator module.

Referring now to FIG. 5B, an example of the cyclic integrator module 310 is shown. The cyclic integrator module 310 may include a difference module 450, a learning gain module 454, a demultiplexer (De-MUX) module 458, a counter module 462, integrators 466-1 ... 466-N (N>1), and a multiplexer (MUX) module 470. For example only, N may equal eight.

The difference module 450 calculates a difference between (i) the determined signal with ripple from the sinc filter module 300 and (ii) the predicted ripple generated by the cyclic integrator module 310. A learning gain is then applied to the difference. For example, the learning gain may also be adjusted by the learning gain module 454 based on the predicted output voltage ripple. The demultiplexer module 458 divides the gain-applied difference into N segments. A counter module 462 may selectively generate a signal according to a counter and the signal may be used to control switching in the demultiplexer module 458 (similar to a clock signal).

The N segments output by the demultiplexer module 458 are then integrated by integrator modules 466-1 ... 466-N (collectively referred to as integrator modules 466), respectively. For example, each of the integrator modules 466 may include a difference module (not shown) that calculates a difference between a corresponding segment and the corresponding segment after a one unit/period delay. The outputs of the integrator modules 466 are combined (reconstructed) by the multiplexer module 470 into the predicted ripple. The signal generated by the counter module 462 may also control the multiplexer module 470.

The predicted ripple is then output to either (i) the ripple removal module 320 or (ii) the ripple analyzer module 210. The ripple removal module 320 generates the filtered error by subtracting the predicted ripple from the error. The filtered error may then be used by the control module 150 (i.e., the compensator module 154) to control duty cycle of the switched-mode power supply. Alternatively, the ripple analyzer module 210 may determine one or more operating parameter(s) based on the predicted ripple. For example, the operating parameter(s) may include, but are not limited to, ESR, ESL, and C of the switched-mode power supply 110. Each of these operating parameters may indicate a capacitance contribution (e.g., $C_{ESR}$, $C_{ESL}$, C). The determined operating parameter(s) may then be used by the control module 150 (i.e., the compensator module 154) to control duty cycle of the switched-mode power supply 110.

The ripple analyzer module 210 may generally determine the operating parameter(s) as follows. First, the Fourier series of the switch waveform may be defined as follows:

$$sw(t) = Vin\left[ duty + \sum_{k=1}^{\infty} \frac{2}{w}\sin\left(\frac{duty}{w}\right)\cos\left(\frac{t+duty/2}{w}\right) + \sum_{k=1}^{\infty} \frac{2}{w}\left(1-\cos\left(\frac{duty}{w}\right)\right)\sin\left(\frac{t+duty/2}{w}\right)\right]$$

where t represents time, w represents frequency, and duty represents duty cycle. Therefore, the Fourier series of the ESL, ESR, and C waveforms, respectively, may be defined as follows:

$$vesl(t) = \left[\sum_{k=1}^{\infty} \frac{2}{w}\sin\left(\frac{duty}{w}\right)\cos\left(\frac{t+duty/2}{w}\right) + \sum_{k=1}^{\infty} \frac{2}{w}\left(1-\cos\left(\frac{duty}{w}\right)\right)\sin\left(\frac{t+duty/2}{w}\right)\right]\frac{VinCesl}{L}$$

$$vcap(t) = \left[\sum_{k=1}^{\infty} \frac{2}{w}\sin\left(\frac{duty}{w}\right)\cos\left(\frac{t+duty/2}{w}\right) + \sum_{k=1}^{\infty} \frac{2}{w}\left(1-\cos\left(\frac{duty}{w}\right)\right)\sin\left(\frac{t+duty/2}{w}\right)\right]\frac{-Tpwm^2 Vin}{LCw^2}$$

$$vesr(t) = \left[\sum_{k=1}^{\infty} \frac{2}{w}\sin\left(\frac{duty}{w}\right)\cos\left(\frac{t+duty/2}{w}\right) + \sum_{k=1}^{\infty} \frac{2}{w}\left(1-\cos\left(\frac{duty}{w}\right)\right)\sin\left(\frac{t+duty/2}{w}\right)\right]\frac{-TpwmCesrVin}{Lw}$$

where Vin represents input voltage, L represents inductance, Tpwm represents PWM period, Cesr represents ESR capacitance, and C represents capacitance.

The ripple analyzer module 210 may then determine (i.e., estimate) the operating parameter(s). For example, the operating parameters C, $C_{ESR}$, and $C_{ESL}$ may be modeled as follows:

$$\begin{bmatrix} vc_0 & vcesr_0 & vcesl_0 \\ vc_1 & vcesr_1 & vcesl_1 \\ vc_2 & vcesr_2 & vcesl_2 \\ vc_3 & vcesr_3 & vcesl_3 \\ vc_4 & vcesr_4 & vcesl_4 \\ vc_5 & vcesr_5 & vcesl_5 \\ vc_6 & vcesr_6 & vcesl_6 \\ vc_7 & vcesr_7 & vcesl_7 \end{bmatrix} \begin{bmatrix} C \\ Cesr \\ Cesl \end{bmatrix} = \begin{bmatrix} vout_0 \\ vout_1 \\ vout_2 \\ vout_3 \\ vout_4 \\ vout_5 \\ vout_6 \\ vout_7 \end{bmatrix},$$

where $vc_0$-$vc_7$ represent samples (i.e., N=8) for ripple due to C, $vcesr_0$-$vcesr_7$ represent samples for ripple due to Cesr, $vcesl_0$-$vcesl_7$ represent samples for ripple due to Cesl, and $vout_0$-$vout_7$ represent samples of the output voltage.

The ripple analyzer module 210 may then perform adaptive analysis to determine (i.e., estimate) the operating parameter(s). The adaptive analysis may generally include representing the operating parameter(s) (to be determined) as a sampled linear combination in matrix form (A) and then determining a root-mean-square (RMS) solution (B) using normalized parameters (p):

$$A = \lfloor vcap^T \; vesr^T \; vesl^T \rfloor$$
$$y = [vout^T[$$
therefore
$$A\begin{bmatrix} cap \\ esr \\ esl \end{bmatrix} = y$$

$$Ap = y$$
$$A^T Ap = A^T y$$
$$p = (A^T A)^{-1} A^T y = By$$
where
$$B = (A^T A)^{-1} A^T.$$

Referring now to FIGS. 6A-6D, simulations of transient response of the ripple canceller module 200 of FIG. 4 are shown. FIG. 6A illustrates the input signal 500 to the ripple canceller module 200 (i.e., the error). FIG. 6B illustrates various learned ripple values 504-1 ... 504-N at each cyclic location (for example, as shown N equals eight). FIG. 6C illustrates acquisition of the ripple value at 512 followed by the estimated (predicted) ripple at 516. Lastly, FIG. 6D illustrates the output signal 520 that is provided to the compensator module 154 (i.e., the filtered error). As shown, the filtered error 520 has no ripple.

Figure 6E:
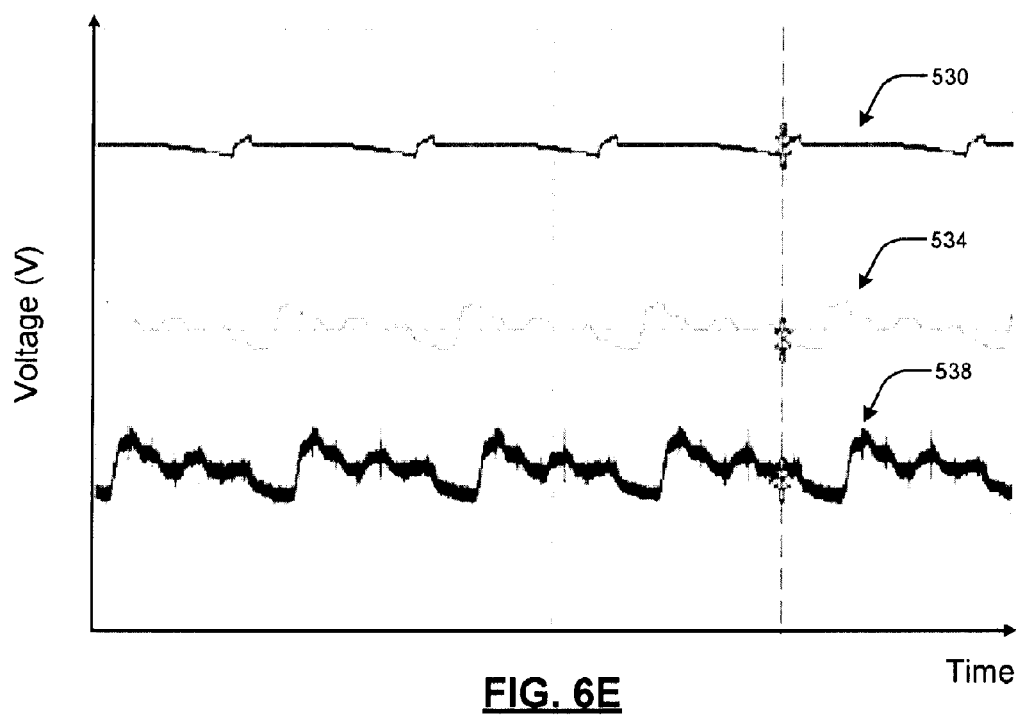
FIGS. 6E and 6F include example simulations of steady-state response of a ripple canceller module.
Figure 6F:
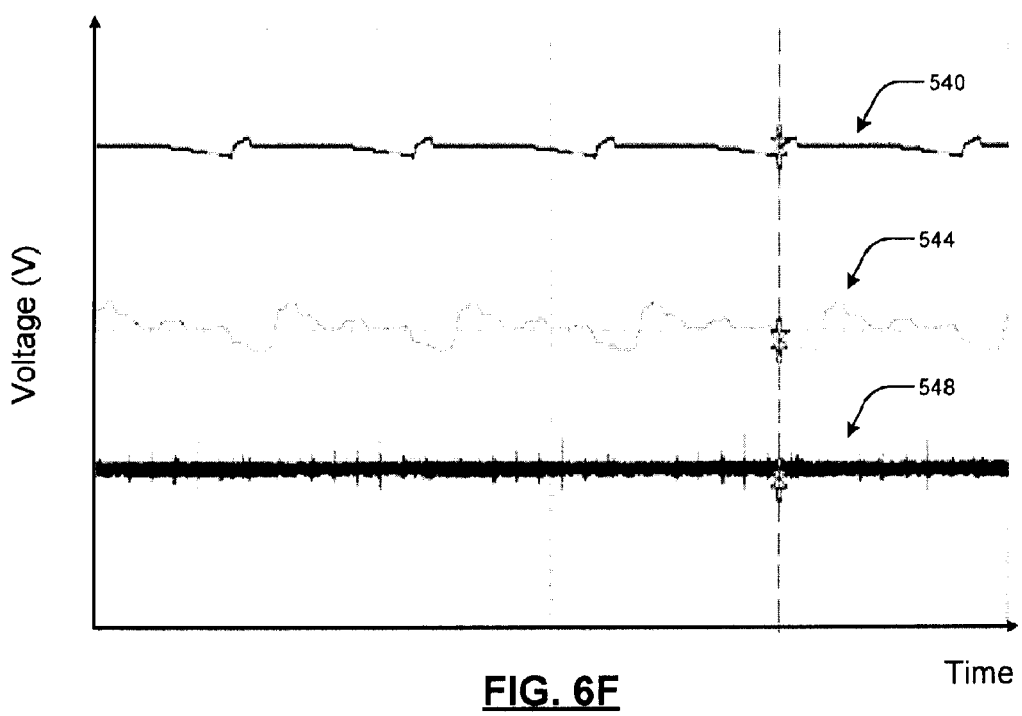

Referring now to FIGS. 6E-6F, simulations of steady-state response of the ripple canceller module 200 of FIG. 4 are shown. FIG. 6E illustrates steady-state response while the ripple canceller module 200 is bypassed or disabled. The output voltage of the switched-mode power supply 110 (reference 530), the measured output voltage $V_{FB}$ (reference 534), and the predicted ripple (reference 538) are each depicted. As shown, the predicted ripple is significant and therefore may cause instability, particularly during high bandwidth operation.

FIG. 6F, on the other hand, illustrates steady-state response while the ripple canceller module 200 is activated. The output voltage of the switched-mode power supply 110 (reference 540), the measured output voltage $V_{FB}$ (reference 544), and the predicted ripple (reference 548) are each depicted. As shown, the ripple canceller module 200 has removed the ripple from the error and therefore the predicted ripple is approximately zero.

Figure 7A:
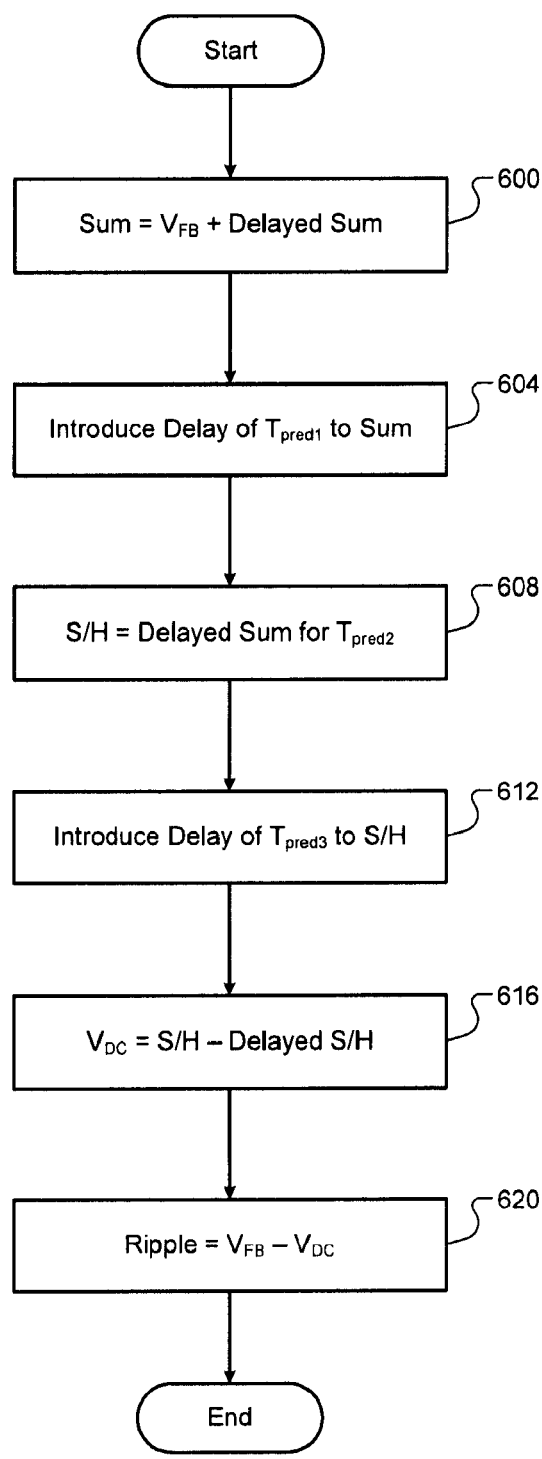
FIG. 7A is a flow diagram illustrating an example method for determining output voltage ripple in a switched-mode power supply.

Referring now to FIG. 7A, an example method for determining output voltage ripple begins at 600. At 600, the sinc filter module 300 calculates a sum of (i) the error between the measured output voltage $V_{FB}$ and the desired (reference) voltage $V_{DES}$ and (ii) a delayed sum (the delayed sum being based on the sum after a first predetermined period $T_{pred1}$). At 604, the sinc filter module 300 generates the delayed sum by introducing a delay of the first predetermined period $T_{pred1}$ to the sum. At 608, the sinc filter module 300 samples (captures) the delayed sum and holds the delayed sum as its output (S/H) for a second predetermined period ($T_{pred2}$).

At 612, the sinc filter module 300 introduces a delay of a third predetermined period ($T_{pred3}$) to the output S/H. At 616, the sinc filter module 300 determines a DC component of the error by calculating a first difference between (i) the S/H output and (ii) the delayed S/H output. At 620, the sinc filter module 300 determines the signal with ripple by calculating a second difference between (i) the error and (ii) the determined DC component. Control may then end or return to 600 for another cycle. The determined signal with ripple may be sent through the cyclic integrator module 310 for ripple prediction.

Figure 7B:
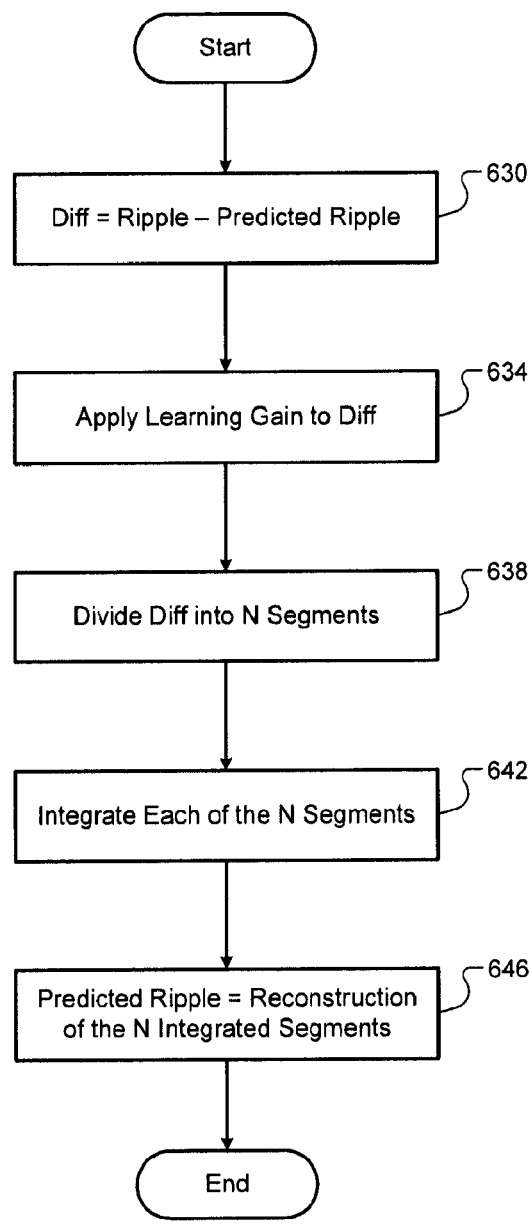
FIG. 7B is a flow diagram illustrating an example method for predicting output voltage ripple in a switched-mode power supply.

Referring now to FIG. 7B, an example method for predicting output voltage ripple begins at 630. At 630, the cyclic integrator module 310 calculates a difference (Diff) between (i) a determined signal with ripple (from the sinc filter module 300) and (ii) a predicted ripple. At 634, the cyclic integrator module 310 applies a learning gain to the difference Diff. At 638, the cyclic integrator module 310 divides the gain-applied difference into N segments. At 642, the cyclic integrator module 310 the N segments using N integrators, respectively. At 646, the cyclic integrator module 310 generates the predicted ripple by reconstructing the N integrated segments. Control may then end or return to 630 for another cycle. The predicted ripple may be sent to the ripple removal module 320 or to the ripple analyzer module 210.

Figure 7C:
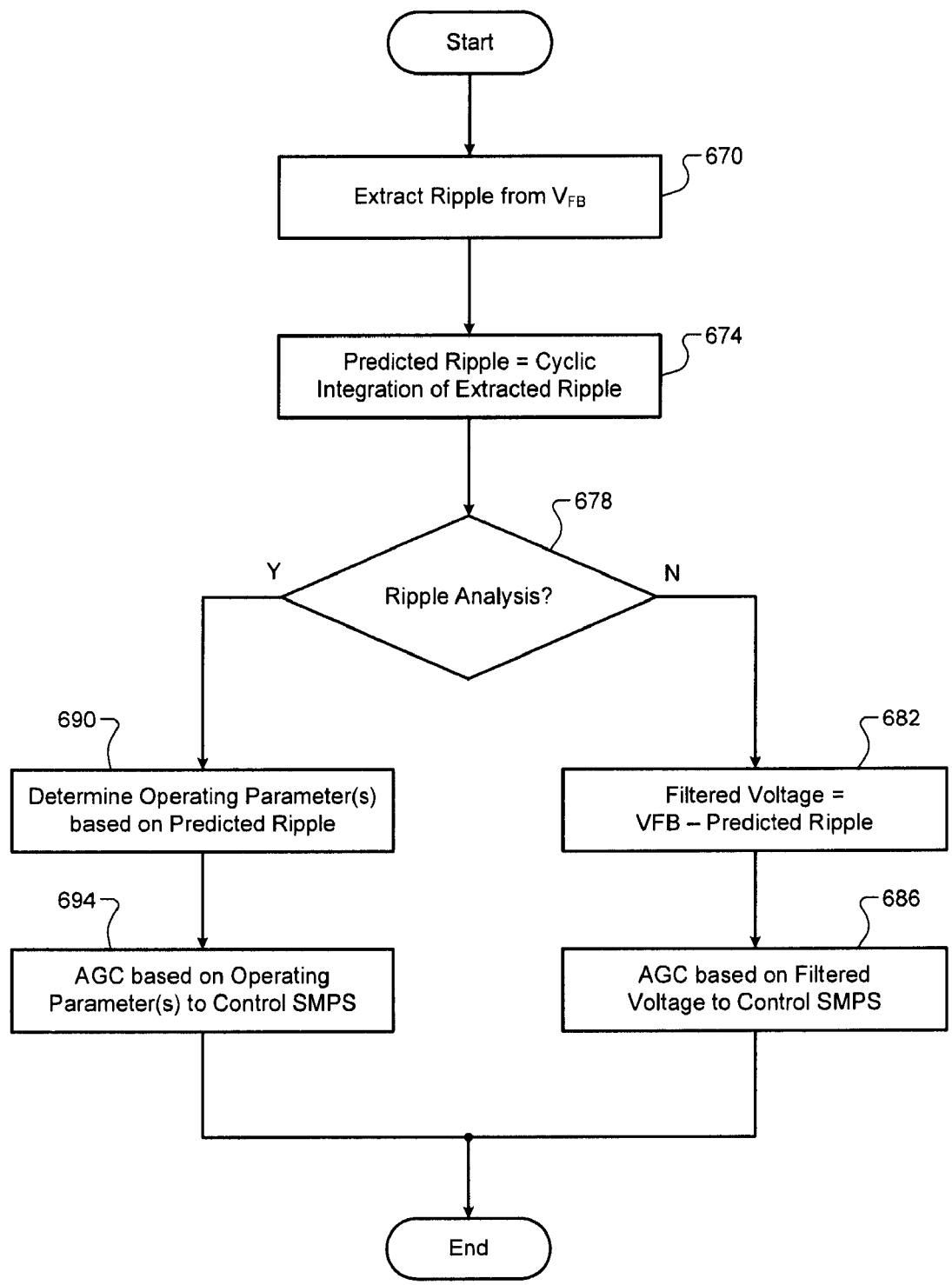
FIG. 7C is a flow diagram illustrating an example method for predicting output voltage ripple and controlling a switched-mode power supply.

Referring now to FIG. 7C, an example method for predicting output voltage ripple and controlling a switched-mode power supply begins at 670. At 670, the sinc filter module 300 determines a signal with ripple based on the error and first, second, and third predetermined periods. At 674, the cyclic integrator module 310 generates a predicted ripple by applying a learning gain to a difference between the determined signal with ripple and a predicted ripple, performing integration on each of N segments of gain-applied difference, and generates the predicted ripple by reconstructing the N integrated segments. At 678, the cyclic integrator module 310 determines whether ripple analysis is to occur. For example, a user of the switched-mode power supply 110 may select the ripple analysis feature. If false, control may proceed to 682. If true, control may proceed to 690.

At 682, the ripple removal module 320 generates the filtered error by subtracting the predicted ripple from the error. At 686, the control module 150 (i.e., the compensator module 154) performs AGC of the duty cycle based on the filtered error to control PWM switching frequency of the switched-mode power supply 110. Control may then end or return to 670 for another control loop. At 690, the ripple analyzer module 210 determines one or more operating parameters of the switched-mode power supply 110 (ESR, ESL, C, etc.) based on the predicted ripple. At 694, the control module 150 (i.e., the compensator module 154) performs AGC based of the duty cycle on the operating parameter(s) to control PWM switching frequency of the switched-mode power supply 110. Control may then end or return to 670 for another cycle.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
  a filter module that (i) generates a direct current (DC) voltage component of an error between an output voltage of a switched-mode power supply and a reference voltage and (ii) generates a signal with ripple by subtracting the DC voltage component from the error; and
  a cyclic integrator module that (i) applies a gain to a difference between the generated signal with ripple and a predicted rippled, (ii) integrates each of N segments of the gain-applied difference, and (iii) generates the predicted ripple by reconstructing the N integrated segments, wherein N is an integer greater than one,
  wherein the filter module includes:
  a feedback filter module that calculates a sum of the error and a delayed sum, wherein the delayed sum is based on the sum after a first predetermined period;
  a sample/hold (S/H) module that samples the delayed sum and outputs the sampled delayed sum after a second predetermined period; and
  a feed-forward integrator module that calculates the DC voltage component based on a difference between the sampled delayed sum and a delayed difference, wherein the delayed difference is based on a third predetermined period,
  wherein each of the first, second, and third periods is a multiple of a Nyquist frequency of the switched-mode power supply.

2. The system of claim 1, further comprising a ripple removal module that generates a filtered error by subtracting the predicted ripple from the error.

3. The system of claim 2, further comprising a control module that performs adaptive gain control (AGC) of a duty cycle of the switched-mode power supply based on the filtered error.

4. The system of claim 1, further comprising a ripple analyzer module that determines an operating parameter of the switched-mode power supply based on the predicted ripple, wherein the operating parameter includes at least one of equivalent series resistance (ESR), equivalent series inductance (ESL), and capacitance (C).

5. The system of claim 4, further comprising a control module that performs adaptive gain control (AGC) of a duty cycle of the switched-mode power supply based on the determined operating parameter.

6. The system of claim 1, wherein the cyclic integrator module further includes:
a difference module that calculates the difference between the generated signal with ripple and the predicted ripple;
a gain module that adjusts the gain based on the predicted ripple, and that applies the gain to the difference;
a demultiplexer module that divides the gain-applied difference into N segments;
N feedback integrator modules that integrate the N segments, respectively; and
a multiplexer module that generates the predicted ripple by reconstructing the N integrated segments.

7. A system comprising:
a sinc filter module that (i) generates a direct current (DC) voltage component of an error between an output voltage of a switched-mode power supply and a reference voltage and (ii) generates a signal with ripple by subtracting the DC voltage component from the error; and
a cyclic integrator module that (i) applies a gain to a difference between the generated signal with ripple and a predicted ripple, (ii) integrates each of N segments of the gain-applied difference, and (iii) generates the predicted ripple by reconstructing the N integrated segments, wherein N is an integer greater than one,
wherein the cyclic integrator module further includes:
a difference module that calculates the difference between the generated signal with ripple and the predicted ripple;
a gain module that adjusts the gain based on the predicted ripple and that applies the gain to the difference;
a demultiplexer module that divides the gain-applied difference into N segments;
N feedback integrator modules that integrate the N segments, respectively; and
a multiplexer module that generates the predicted ripple by reconstructing the N integrated segments.

8. The system of claim 7, wherein the cyclic integrator module further includes:
a counter module that selectively enables each of (i) the demultiplexer module and (ii) the multiplexer module.

9. A method comprising:
generating a direct current (DC) voltage component of an error between an output voltage of a switched-mode power supply and a reference voltage;
generating a signal with ripple by subtracting the DC voltage component from the error;
applying a gain to a difference between the generated signal with ripple and a predicted ripple;
integrating each of N segments of the gain-applied difference, wherein N is an integer greater than one;
generating the predicted ripple by reconstructing the N integrated segments;
calculating a sum of the error and a delayed sum, wherein the delayed sum is based on the sum after a first predetermined period;
sampling the delayed sum and outputting the sampled delayed sum for a second predetermined period; and
calculating the DC voltage component based on a difference between the sampled delayed sum and a delayed difference, wherein the delayed difference is based on a third predetermined period, and wherein each of the first, second, and third periods is a multiple of a Nyquist frequency of the switched-mode power supply.

10. The method of claim 9, further comprising generating a filtered error by subtracting the predicted ripple from the error.

11. The method of claim 10, further comprising performing adaptive gain control (AGC) of a duty cycle of the switched-mode power supply based on the filtered error.

12. The method of claim 9, further comprising determining an operating parameter of the switched-mode power supply based on the predicted ripple, wherein the operating parameter includes at least one of equivalent series resistance (ESR), equivalent series inductance (ESL), and capacitance (C).

13. The method of claim 12, further comprising performing adaptive gain control (AGC) of a duty cycle of the switched-mode power supply based on the determined operating parameter.

14. The method of claim 9, further comprising:
calculating the difference between the generated signal with ripple and the predicted ripple;
adjusting the gain based on the predicted ripple and applying the gain to the difference;
dividing the gain-applied difference into N segments;
integrating each of the N segments; and
generating the predicted ripple by reconstructing the N integrated segments.

15. A method comprising:
generating a direct current (DC) voltage component of an error between an output voltage of a switched-mode power supply and a reference voltage;
generating a signal with ripple by subtracting the DC voltage component from the error;
applying a gain to a difference between the generated signal with ripple and a predicted ripple;
integrating each of N segments of the gain-applied difference, wherein N is an integer greater than one;
generating the predicted ripple by reconstructing the N integrated segments;
calculating the difference between the generated signal with ripple and the predicted ripple;
adjusting the gain based on the predicted ripple and applying the gain to the difference;
dividing the gain-applied difference into N segments;
integrating each of the N segments; and
generating the predicted ripple by reconstructing the N integrated segments.

16. The method of claim 15, further comprising:
selectively enabling each of (i) dividing the gain-applied difference into N segments and (ii) generating the predicted ripple by reconstructing the N integrated segments.

17. A controller for a switched-mode power supply, comprising:
a filter module including:
a feedback filter module that calculates a sum of an error and a delayed sum, wherein the error is based on a difference between an output voltage of a switched-mode power supply and a reference voltage, and wherein the delayed sum is based on the sum and a first predetermined period;
a sample/hold (S/H) module that samples the delayed sum and outputs the sampled delayed sum after a second predetermined period; and a feed-forward integrator module that calculates a DC voltage component based on a difference between the sampled delayed sum and a delayed difference, wherein the delayed difference is based on a third predetermined period, wherein each of the first, second, and third periods is a multiple of a Nyquist frequency of the switched-mode power supply.

18. The controller of claim 17, further comprising:
a cyclic integrator module including:
 a difference module that calculates a difference between the generated signal with ripple and a predicted ripple;
 a gain module that adjusts a gain based on the predicted ripple and that applies the gain to the difference;
 a demultiplexer module that divides the gain-applied difference into N segments;
 N feedback integrator modules that integrate the N segments, respectively; and
a multiplexer module that generates the predicted ripple by reconstructing the N integrated segments.

* * * * *

UNITED STATES PATENT AND TRADEMARK OFFICE
CERTIFICATE OF CORRECTION

| | |
|---|---|
| PATENT NO. | : 8,698,469 B1 |
| APPLICATION NO. | : 13/230263 |
| DATED | : April 15, 2014 |
| INVENTOR(S) | : Paul Walker Latham, II |

It is certified that error appears in the above-identified patent and that said Letters Patent is hereby corrected as shown below:

In the Specification:

Column 1, Line 51    Delete "(z')" and insert --($z^{-1}$)--

In the Claims:

Column 10, Line 38, Claim 1    Delete "rippled," and insert --ripple,--

Signed and Sealed this
Eighth Day of July, 2014

Michelle K. Lee
*Deputy Director of the United States Patent and Trademark Office*